(12) United States Patent
Barki (10) Patent No.: US 10,434,415 B1
(45) Date of Patent: *Oct. 8, 2019

(54) METHOD OF MODIFYING LOCATIONS

(71) Applicant: Yaacov Barki, Tel Aviv (IL)

(72) Inventor: Yaacov Barki, Tel Aviv (IL)

(*) Notice: Subject to any disclaimer, the term of this patent is extended or adjusted under 35 U.S.C. 154(b) by 112 days.

This patent is subject to a terminal disclaimer.

(21) Appl. No.: 15/592,943

(22) Filed: May 11, 2017

Related U.S. Application Data (63) Continuation-in-part of application No. 13/952,680, filed on Jul. 29, 2013, now Pat. No. 9,717,984.

(60) Provisional application No. 61/741,867, filed on Jul. 30, 2012.

(51) Int. Cl.
*A63F 13/00* (2014.01)
*A63F 13/65* (2014.01)
*A63F 13/35* (2014.01)

(52) U.S. Cl.
CPC .............. *A63F 13/65* (2014.09); *A63F 13/35* (2014.09); *A63F 2300/8082* (2013.01)

(58) Field of Classification Search
None
See application file for complete search history.

(56) References Cited

U.S. PATENT DOCUMENTS

| | | | | |
|---|---|---|---|---|
| 9,669,293 B1* | 6/2017 | Kornmann | ............... | A63F 13/00 |
| 9,669,296 B1* | 6/2017 | Hibbert | .................. | A63F 13/12 |
| 9,717,984 B1* | 8/2017 | Barki | ...................... | A63F 13/12 |
| 9,782,668 B1* | 10/2017 | Golden | ................... | A63F 13/00 |
| 9,830,513 B2* | 11/2017 | Gustafsson | ........ | G06K 9/00604 |
| 2004/0002843 A1* | 1/2004 | Robarts | ................... | A63F 13/10 |
| | | | | 703/13 |
| 2005/0009608 A1* | 1/2005 | Robarts | ................ | A63F 13/216 |
| | | | | 463/42 |
| 2017/0043255 A1* | 2/2017 | Savolainen | ............ | H04W 4/80 |
| 2017/0324841 A1* | 11/2017 | Clement | ................ | H04L 67/38 |

* cited by examiner

*Primary Examiner* — Jay Trent Liddle
*Assistant Examiner* — Alex F. R. P. Rada, II
(74) *Attorney, Agent, or Firm* — Alphapatent Associates, Ltd; Daniel J. Swirsky

(57) ABSTRACT

The subject matter discloses a method performed by a computerized server communicating with multiple computerized devices, at least some devices are wearable devices associated with users, for planning a real world location. The method comprises receiving information concerning a real world location, modeling the real world location into a virtual location, receiving a plurality of requests for modifying said virtual location from the users via wearable devices, the requests comprise operations, selecting an operation for modifying the virtual location, processing said selected operation for modifying said virtual location and transmitting the selected operation to a computerized device of a person, thereby instructing the person to modify said real world location according to the selected operation.

20 Claims, 9 Drawing Sheets

METHOD OF MODIFYING LOCATIONS

CROSS-REFERENCE TO RELATED APPLICATION

This application is a continuation-in-part to U.S. patent application Ser. No. 13/952,680, filed Jul. 29, 2013, which claims priority to U.S. Provisional Application No. 61/741,867, filed Jul. 30, 2012, both of which are hereby incorporated by reference in their entirety.

FIELD OF THE INVENTION

The present disclosure relates to a method of planning a location using crowd.

BACKGROUND OF THE INVENTION

Building virtual towns and other urban establishments has long been one of mankind's best selling games, weather through kids constructing houses with Lego bricks, Monopoly or Tetris, or through adult games such as SimCity, CityVille, FarmVille and alike. Building urban establishment prevails today in social gaming, the most widely played genre on the internet and mobile.

A virtual world is an online community (i.e. multiple users) that takes the form of a computer-based simulated environment through which users can interact with one another and use and create objects. Via a computer, the user accesses a computer-simulated world that presents perceptual stimuli to the user, who in turn can manipulate elements of the modeled world and thus experience a degree of presence. Such modeled worlds and their rules may draw from the reality or fantasy worlds. Example rules are gravity, topography, locomotion, real-time actions, and communication. Communication between users can range from text, graphical icons, visual gesture, sound, and rarely, forms using touch, voice command, and balance senses. Players create a character that travels between buildings, towns, and worlds to carry out business or leisure activities. According to K Zero, a virtual world consultancy service, there were over 1 billion (1,009,000,000) people worldwide registered in virtual worlds. Most accepted definitions of virtual worlds require that it be persistent; in other words, the world must continue to exist even after a user exits the world, and user-made changes to the world should be preserved.

All over the world, cross cultures and lifestyles, people seem to get addicted to mindless playing activities that exhaust free time. These may include playing Solitaire, taking care of a Tamagotchi, building a neighborhood in CityVille, talking to Talking Tom the Cat, playing Tetris, taking care of a Webkinz virtual creature, and so forth.

Crowdsourcing is, according to the Merriam-Webster Dictionary, the practice of obtaining needed services, ideas, or content by soliciting contributions from a large group of people, and especially from an online community, rather than from traditional employees or suppliers. Often used to subdivide tedious work or to fund-raise startup companies and charities, this process can occur both online and offline. It combines the efforts of crowds of self-identified volunteers or part-time workers, where each one on their own initiative adds a small portion that combines into a greater result. Crowdsourcing is different from an ordinary outsourcing since it is a task or problem that is outsourced to an undefined public rather than to a specific, named group.

BRIEF SUMMARY OF THE INVENTION

Embodiments of the invention enable garners to gain real value for the time they spend. This twist of making something real at the end of the game serves people's desire to do something constructive.

Embodiments of the invention bridge the gap between virtual games and reality by developing a gaming platform which turns virtual to reality.

One exemplary embodiment of the disclosed subject matter discloses in a virtual location in an interactive multiplayer game of an online or mobile environment, the interactive game modeling a real world area of real estate, wherein operations by players of the interactive game influence development of the real estate, a method; the method comprises by a computerized device, receiving from a plurality of players of the interactive game a plurality of requests for modifying the virtual location; wherein the requests comprising operations; wherein the operations being selected from a list provided by the interactive game; by the computerized device, selecting a selected operation from a the operations of the plurality of requests; where the selecting being according to a rule; wherein the rule being stored in a memory of the computerized device; and by the computerized device, processing the selected operation for modifying the virtual location; wherein the virtual location comprises an at least one virtual element and wherein the operation comprises one member of a group consisting of: adding the virtual element, removing the virtual element and modifying characteristic of the virtual element; thereby enabling the modifying of the real world area according to a decision of a majority of the players.

According to some embodiments the piece of real estate becomes more valuable as a result of the processing the selected operation. According to some embodiments the virtual element is a model of real estate in the real world. According to some embodiments the virtual element is a model of real estate that is offered to be built in the real world. According to some embodiments, the virtual element is one member of a group consisting of a house, a road, a rail train, a park, a building, a public location, an artificial lake, a mall, a church businesses, buildings, attractions, services, facilities, objects, inhabitants, professional offices, trade offices, banks, factories, real estate offices, hotels, motels, restaurants, diners, coffee shops, bars, night clubs, casinos, stores, shops, and salons. According to some embodiments the buildings are selected from the group consisting of: skyscrapers, towers, temples, churches, halls, apartments, house, condominiums, theaters, libraries and museums. According to some embodiments the attractions are selected from the group consisting of: theaters, museums, architectural landmarks, prominent and/or historical buildings, sculptures, art galleries, aquariums, planetariums, sports stadiums, scenic vistas, amusement parks, fountains, beaches, and bodies of water such as rivers, lakes, and canals. According to some embodiments the services are selected from the group consisting of: city services including police, fire and emergency services; transportation services including taxis, buses, trains, trams, shuttles, and subways; medical services including hospitals, urgent care centers and doctor's offices; academic services including schools, universities, libraries and colleges; and religious services including temples, churches, synagogues, chapels, mosques and other places of worship. According to some embodiments the facilities are selected from the group consisting of:

plazas, squares, convention centers, convocation centers, stadiums and arenas, airports, train stations, bus depots and taxi stands.

According to some embodiments the virtual location may be a model of a real town, a model of a real island, a model of a real farm, a model of a real Ski resort, a model of a real beach resort, a model of a real village, a model of a real forest, a model of a real jungle, a model of a real vineyard, a model of a real mansion, a model of a real castle, a model of an amusement park, a model of a real city, a model of a real zoo and a model of a real casino.

According to some embodiments the method, further comprises rewarding the players with real estates. According to some embodiments the rule comprises one member of a group consisting of: selecting from a majority of requests comprising the same operation, selecting a result of an interpolation on the requests, and selection a selecting operation being compatible with previous selected operations. According to some embodiments the characteristic of the virtual element being one member of a group consisting of size, name, design characteristic, designation of the element, utilization of the element, location and color.

One other exemplary embodiment of the disclosed subject matter discloses in a virtual location in an interactive game of an online or mobile modeling a real world area of real estate wherein operations by players of the interactive game influence development of the real estate, a method; the method comprises the steps of: receiving from a plurality of players of the interactive game a plurality of requests for trading virtual real estate elements of the interactive game; within the interactive game modifying value of virtual prices associated with the virtual real estate elements as a result of the requests; and within the interactive game modifying value of real prices of real estate goods; wherein the real estate goods being modeled by the virtual real estate elements; the modifying being relative to the modifying of the virtual prices values; thereby causing an increase in demand within the area of real estate and causing price increases for land within the area of real estate.

According to some embodiments the virtual location may be a model of a real town, a model of a real island, a model of a real farm, a model of a real Ski resort, a model of a real beach resort, a model of a real village, a model of a real forest, a model of a real jungle, a model of a real vineyard, a model of a real mansion, a model of a real castle, a model of an amusement park, a model of a real city, a model of a real zoo or a model of a real casino.

One other exemplary embodiment of the disclosed subject matter discloses a computer program product for managing an interactive game, the computer program product comprising a computer readable storage medium having program code embodied therewith, the program code executable by a computer to perform a method comprising: receiving from a plurality of players of the interactive game a plurality of requests for modifying virtual location; wherein the requests comprising operations; wherein the operations being selected from a list provided by the interactive game; selecting a selected operation from the plurality of operations; where the selecting being according to a rule; wherein the rule being stored in a memory of the computerized device and processing the selected operation for modifying the virtual location; wherein the virtual location comprises an at least one virtual element and the modifying the location comprises one member of a group consisting of adding the virtual element, removing the virtual element and modifying characteristic of the virtual element; thereby enabling the modifying of the real world area according to a decision of a majority of the players.

BRIEF DESCRIPTION OF SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION OF THE INVENTION

Embodiments of the invention disclose an online or mobile platform for playing an interactive multiplayer game modeling a real world area of real estate, wherein operations by players of the interactive game influence development of the real estate that is modeled by the interactive game.

According to some embodiments rules for manipulated elements in the game may draw from the rules of the real world area of real estate. Example of such rules is gravity, topography, locomotion, real-time operations, and communication.

According to some embodiments a model of a ghost town or a non developed place or a town with low popularity may be provided by the game platform and may be used for attracting the players of the game to buy real estate in this area. It will be appreciated that the creation of a new town may require encountering any missions and decisions that need to be addressed and optimized based on the players' input and the best possible outcome for the proliferation of the newly designed town; where houses will be located, their preferred structure, where business centers may be located, how the town center looks, the town's name, how big the shops should be, what is provided in parks and recreational areas, whether there are fountains roundabouts, street names and so forth. By playing such an interactive multiplayer game, the layers can influence the building of the town and, by doing so may increase their interest in buying real estate in the town.

The gaming platform enables the players to trade virtual assets and estates. Such trading affects the virtual prices associated with the virtual assets. According to some embodiments the gaming platform increase or decrease the prices associated with estates of the real world relatively to changes of the associated virtual estates. That is to say, if a virtual value associated with a virtual estate of the interactive multiplayer game is increased, the real value of the real estate that is associated with the virtual estate is increased relatively to the increase of the virtual price. A real estate that is associated with the virtual estate is a real estate that is located in the real location that is associated with the virtual location. The platform associates virtual values with virtual estates. The platform associates virtual values with real values of the real estate that is associated with the virtual estate.

Embodiments are directed at a cycle of progression from an idea, through its virtual development by a community of gamers into a realization mode and then into reality. A community may be constructed that is influenced in form by participants of this the game. Embodiments provide a low platform for reaching large numbers of users. According to some embodiments, a virtual game may be realized, driving change and developing a new town or revitalizing an existing one, with a population influx, job creation and celebrity status.

Embodiments may run on a social network platform such as Facebook platform and may derive functionality from current popular social games such as CityVille and FarmVille.

In some embodiments an outcome of the game shifts into a realization mode, to provide a realistic monument. In some embodiments the real world area is modified and manipulated according to a selection of a majority of players. In some embodiments, a real community is created based on the community of players and in other embodiments an existing community is influenced by the cumulative input and decisions of players in the game. Some embodiments are directed to providing a town. In some embodiments, a real-town may draw its character as well as its residents from the game.

In some embodiments people may be involved in tasks while creating a new town. In some embodiments, individuals become committed and involved due to a commitment to other members, some of which are his/her social network friends, and some being future neighbors.

Some embodiments may present the players with a simulated model of the town that is a cumulative optimized form of all the input from all the players together. This cumulative model represents a crowd-sourced result and best inputs from all players and may be a basis for a future real town to be established. Thus, by playing and developing their virtual town, each player contributes his/her own wisdom to a cumulative wisdom of the crowd. It is in a sense, creating a town based on 'crowdsourcing'. By adopting a decision from the cumulative town to a player's personal model of the town, the player practically strengthens this aspect in the sense that 'more players' think this should be done in this manner. For example, a player can offer to name a street by a particular name, or adopt a name offered and chosen by others, thus strengthening that name as a chosen decision by the lot. Each player may have full flexibility in designing his virtual town, and will be able to draw upon decisions made by others in their town. Groups of players will be able to form in order to promote a certain aspect of the town such as characterizing neighborhoods in a unique manner or promoting a fountain in the town square, etc. Players with more points will have more influence on the outcome as they played more hours, joined the game earlier, invited more friends, or contributed more to the underline selected structure of the newly designed town.

According to some embodiments the outcome of the multiplayer game is a real town, built based on the character and decisions of the playing crowd. Players are able to join at any time throughout the game. Once the game finishes, it may move to a new phase of building a physical town according to the modified model. At the end of the game, players may be able to purchase real-estate in the town. In some embodiments the prices of the real estate's are determined by the game platform and are relative to the virtual prices. Optionally incentives such as prices and location may be biased towards those that contributed more than others towards the design of the final form of the city. This twist of making something real at the end of the game may serve the common desire to do something constructive for the common good. Building a new town with new houses, businesses and poring life into it may inspire people, especially in places where so many houses stand abandoned and entire neighborhoods are demolished because no-one wants to live in them. Embodiments of the present invention are directed to methods and systems that draw inspiration from several worlds, the social network gaming world which is its core, along with elements attributable to reality television and MMOG. The term massively multiplayer online game (MMOG) refers to a multiplayer game which is capable of supporting large numbers of players simultaneously.

Figure 1:
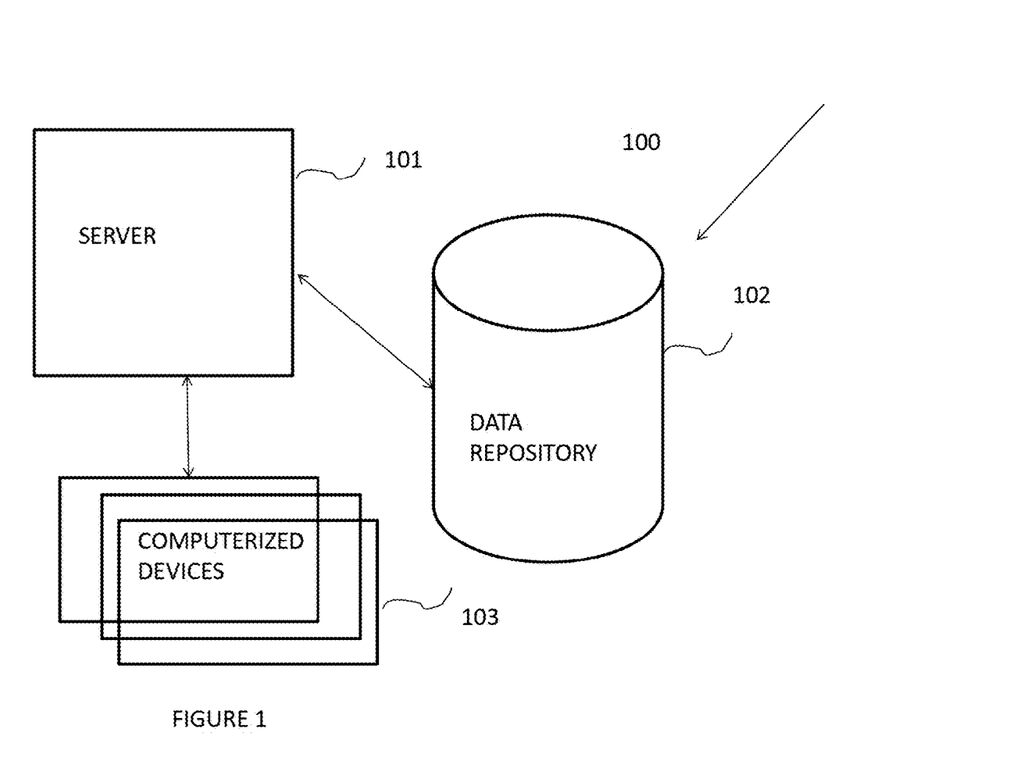
FIG. 1 shows a block diagram of a system including a platform for an interactive multiplayer game, in accordance with some exemplary embodiments of the subject matter.

Referring now to FIG. 1 showing a block diagram of a system including a platform for an interactive multiplayer game, in accordance with some exemplary embodiments of the subject matter.

System 100 includes a server 101, a data repository 102 and a plurality of computerized devices 103.

The server 101 provides a platform for the interactive multiplayer game. The game is played on a model of a real location according to constraints and rules of the real location. The interactive game enable users to design the location (e.g. a town) and thus to influence the real design of the real location. The server 101 is configured for receiving from players of the interactive game requests for modifying the location. The requests include operations. The operations include adding or removing virtual elements in the virtual location and modifying characteristics of the virtual elements. The server 101 is configured for selecting an operation from the operations according to criteria and for processing the selected operation. Examples of such criteria are an operation which is included in a majority of the requests and an operation that is requested by a priority user. For example, if a majority of the users wish to add a virtual church in a certain virtual location, the virtual church is added to the virtual location.

The server 101 is also configured for receiving from a plurality of players of the massively multiplayer online game a plurality of requests for trading virtual real estate elements of the game, for changing virtual prices values associated with the virtual real estate elements as a result of the requests and for changing real prices values of real estate goods associated with the virtual real estate elements. The requests are sent from the computerized devices 103 of the users.

Examples of the computerized devices 103 are personal computers, cellular telephones and IPADS. The data repository 102 is configured for storing the virtual model and the virtual elements, for storing the virtual prices of the virtual elements and for storing the real prices of the real elements.

Figure 2:
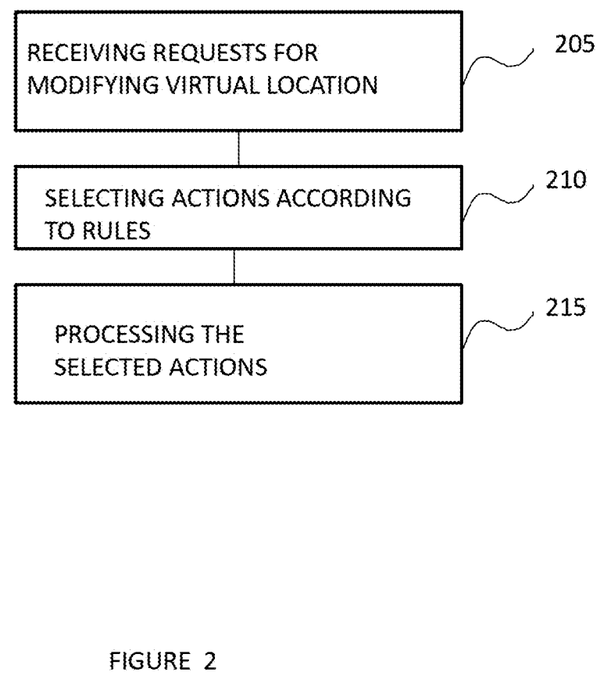
FIG. 2 shows a flowchart diagram of a first method for an operating an interactive multiplayer game, in accordance with some exemplary embodiments of the disclosed subject matter.

FIG. 2 shows a flowchart diagram of a first method for operating an interactive multiplayer game, in accordance with some exemplary embodiments of the disclosed subject matter. In one embodiment, the method is implemented by a server. In one embodiment the interactive multiplayer game is a Massively Multiplayer Online game.

At 205, requests for modifying virtual location are received from a plurality of players of an interactive game. The requests include operations. The requests may be received from the computerized devices of the users via the internet network or the cellular network or any other computerized network. The operations are selected by the users from a list provided by the interactive game. Examples of such operations are adding a virtual element, removing a virtual element and changing characteristics of a virtual element. The virtual location may be a model of a real town, a model of a real island, a model of a real farm, a model of a real Ski resort, a model of a real beach resort, a model of a real village, a model of a real forest, a model of a real jungle, a model of a real vineyard, a model of a real mansion, a model of a real castle, a model of an amusement park, a model of a real city, a model of a real zoo or a model of a real casino. Examples of virtual elements are house, a road, a rail train, a park, a building, a public location, an artificial lake, a mall and a church, businesses, buildings, attractions, services, facilities, objects, inhabitants, professional offices, trade offices, banks, factories, real estate offices, hotels, motels, restaurants, diners, coffee shops, bars, night clubs, casinos, stores, shops, and salons. The virtual elements may be implemented by JPEG images or icons.

At 210, one or more operations are selected by the server from a plurality of operations according to rules stored in a memory of the server. Examples of such rules are: selecting the operation that is included in a majority of requests, selecting an operation according to an interpolation (regression analysis) of the actions received from the users, weighting each selection according to a weight associated with the sender and selecting the request having the highest weight and selecting an operation that compatible with previous selected operations. In some embodiments each user is associated with a weight. In one embodiment users are weighted according to the ownership of virtual estates. In one embodiment users are weighted according to the ownership of real life estates. A priority user is a user having a weight that is greater than a threshold.

In one example, an operation that is compatible with a previous operation of inserting a virtual lake is adding a virtual house in the neighborhood of the lake. An operation that is not compatible with previous operation may be for example adding a virtual apartment building in the neighborhood of the lake.

At 215 the selected operation is processed, by adding the selected virtual element to the model or by removing a selected virtual element or by changing characteristic of a virtual element. Examples for such characteristics are size, name, design characteristic, designation of the element, and utilization of the element, location and color.

Figure 3:
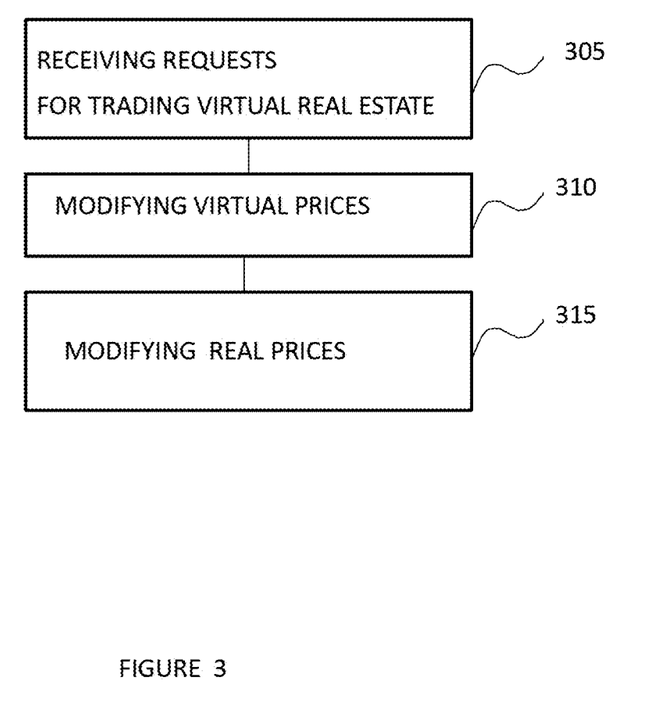
FIG. 3 shows a flowchart diagram of a second method for operating an interactive multiplayer game, in accordance with some exemplary embodiments of the disclosed subject matter.

FIG. 3 shows a flowchart diagram of a second method for an operating an interactive multiplayer game, in accordance with some exemplary embodiments of the disclosed subject matter. In one embodiment, the method is implemented by a server. In one embodiment the interactive multiplayer game is a Massively Multiplayer Online game.

At 305, requests for trading virtual real estate are receiving from a plurality of players of the interactive game.

At 310, values of virtual prices associated with the virtual real estate elements are modified as a result of the requests. For example if one user requested to buy a virtual house from a second user for a price of 20$ and the second user agrees to this price, the virtual price of the virtual house is modified to 20$.

At 315, real prices of real estate goods modeled by the virtual real estate elements are modified. The modification is relative to the changing of the virtual prices values. For example, if a virtual value of a house increases by 10%, the real value of the real house which is modeled by the virtual house increased by 10%.

Figure 4A:
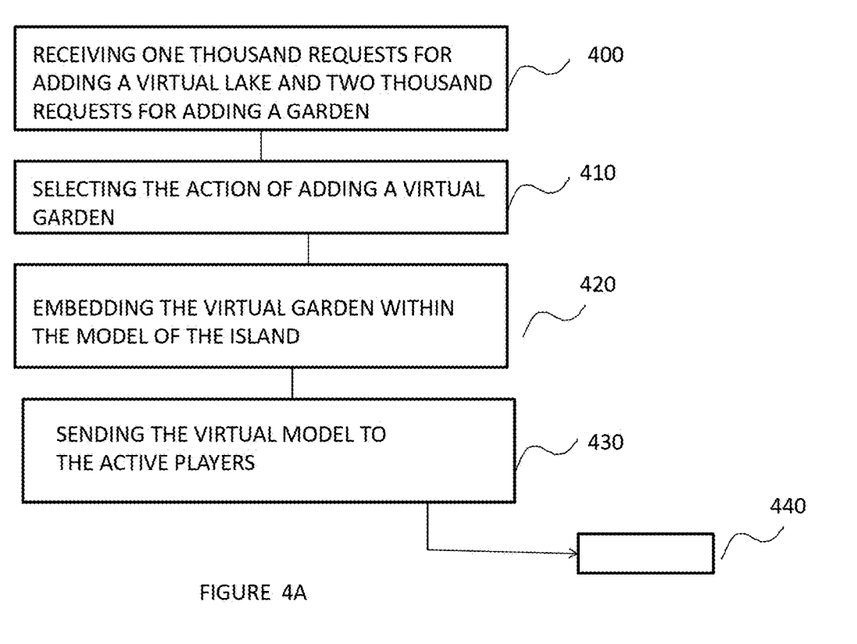
FIGS. 4A and 4B show a flowchart diagram of a scenario of playing an interactive multiplayer game, in accordance with some exemplary embodiments of the disclosed subject matter.
Figure 4B:
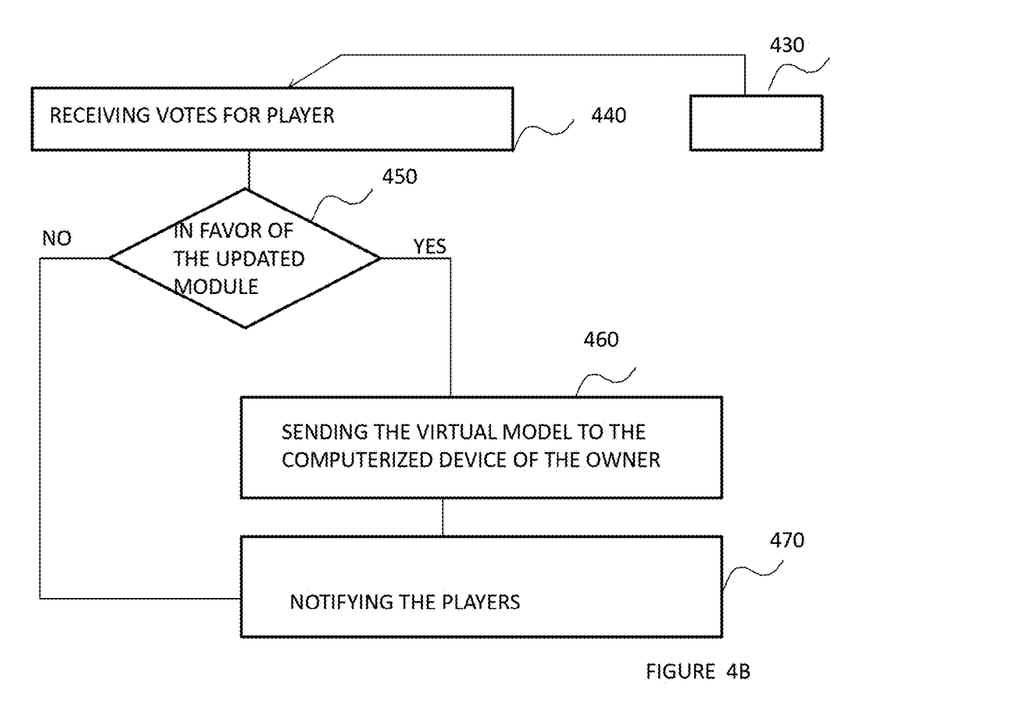

FIGS. 4A and 4B show a flowchart diagram of a scenario of playing an interactive multiplayer game, in accordance with some exemplary embodiments of the disclosed subject matter.

At 400, one thousand requests for adding a virtual lake to area A in a model of a real island and two thousand requests for adding a garden are received by the server.

At 410 the operation of adding a virtual garden is selected by the server (an operation with a majority of requests).

At 420, the server embedded the virtual garden within location A of the model of the island. The garden is embedded according to constrains and rules of the real world. Thus, topography of area A may influence the embedding of the garden.

At 430, the update virtual model is sent to all the active players. The active players view the model with the virtual garden.

At 440 the server receives vote of players for adding a real garden modeled by the virtual garden to real area A.

At 450, the server calculates the result of the vote by accumulating the number of votes in favor of adding the real garden and the number of votes against adding the real garden.

If the majority decides to add a real garden, then at 460 a request is sent from the server to the computerized device of the owner of the island. The request includes the model with the embedded garden.

At 470, the server notifies the players about the result of the vote.

Figure 5:
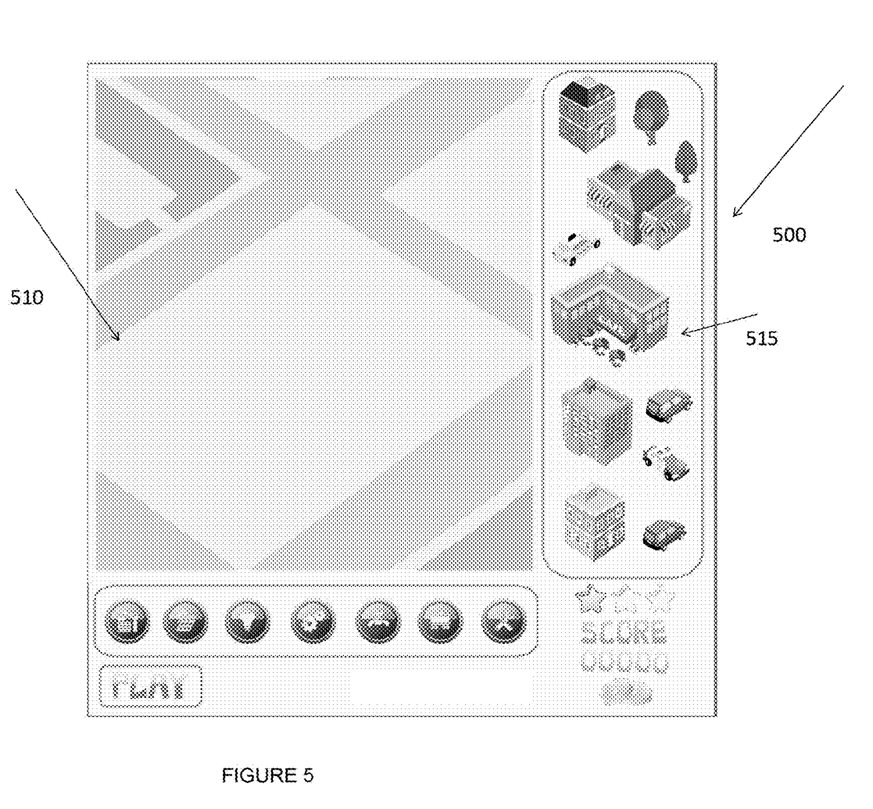
FIG. 5 shows an exemplary display showing a real estate model of the interactive multiplayer game before being manipulated by the users, in accordance with some exemplary embodiments of the disclosed subject matter.

FIG. 5 shows an exemplary display showing a real estate model of the interactive multiplayer game before being manipulated by the users, in accordance with some exemplary embodiments of the disclosed subject matter.

Display 500 includes a clean model 510. A clean model 510 is a model before being manipulated by the users. Display 500 includes virtual elements 515. The virtual elements 515 can be added to the clean model 510 by, for example, a dragging command, or by gestures. Adding the virtual elements by a player cause a command of adding the element to be sent to the server.

Figure 6:
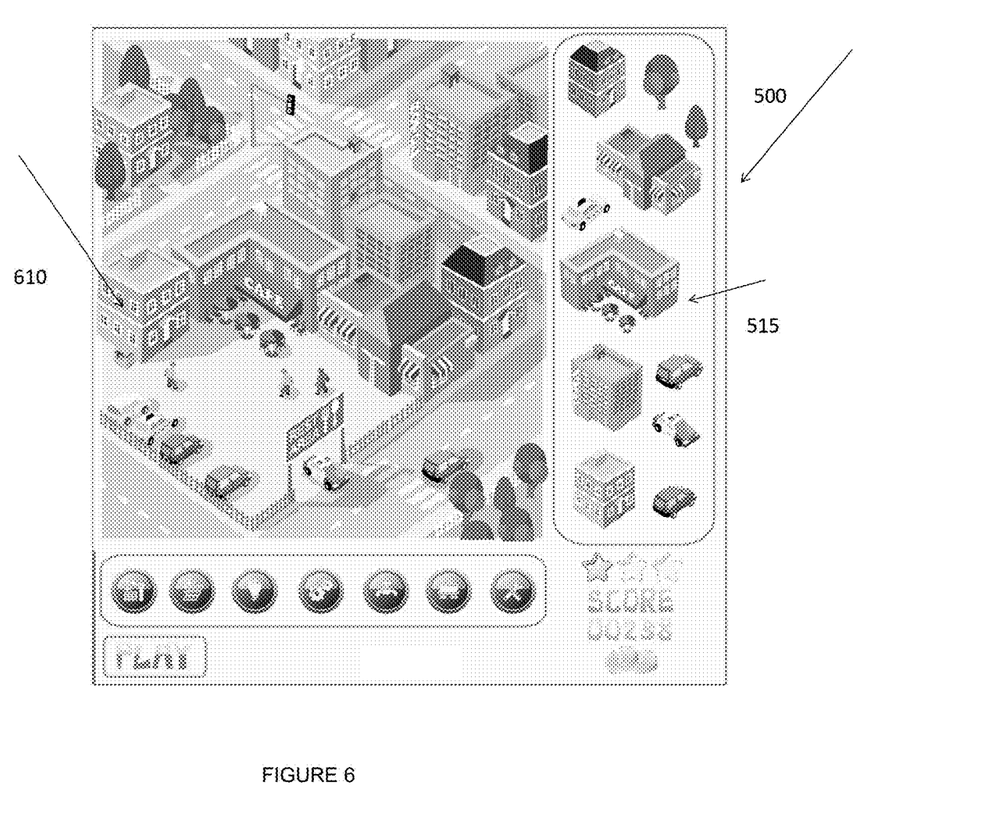
FIG. 6 shows an exemplary display showing a real estate model of the interactive multiplayer game after being manipulated by the users, in accordance with some exemplary embodiments of the disclosed subject matter.

FIG. 6 shows an exemplary display showing a real estate model of the interactive multiplayer game after being manipulated by the users, in accordance with some exemplary embodiments of the disclosed subject matter.

Display 600 includes a modified model 610. The modified model 610 is the model after being manipulated by the users and virtual elements 515. The virtual elements 515 can be added to the modified model 610 and remove from the modified model 610 by, for example, a dragging command, or by gestures.

Figure 7:
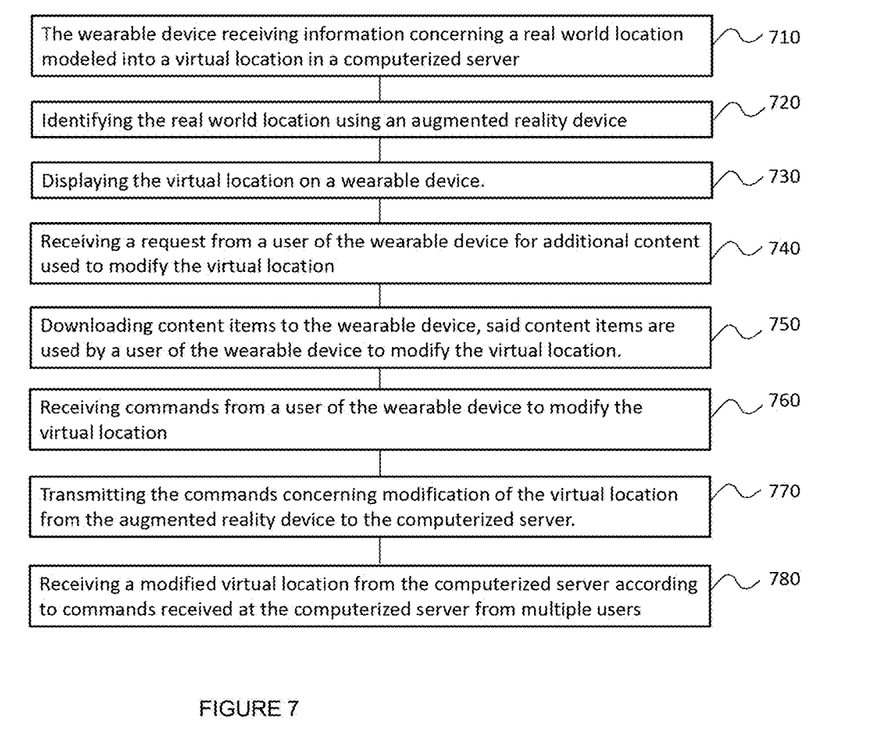
FIG. 7 shows a method of modeling a real location using a wearable device, in accordance with some exemplary embodiments of the disclosed subject matter.

FIG. 7 shows a method of modeling a real location using a wearable device, in accordance with some exemplary embodiments of the disclosed subject matter. The method is performed on the client side, also defined as the wearable device. The wearable device comprises a display unit enabling a user of the wearable device to view a model of the real world location, the model is also defined as a virtual location. The wearable device may be a virtual reality (VR) device, for example a helmet, enabling its user to navigate in the virtual location by changing a relative direction or an azimuth of the VR device or according to physical gestures of the user. In some other cases, the wearable device may be an augmented reality (AR) device, for example smart glasses. In such case, the AR device may identify the real location on-site and display the virtual location automatically. Both the AR device and the VR device enable the user to add content or input commands into the model. The wearable device may communicate with a mobile computerized device such as a tablet or phone, for example in case the mobile computerized device stores content configured to be used by the user of the wearable device when modifying the model of the real location. Such content may be images, a set of constraints and the like. The content in the mobile computerized device may be received from a cellular network from the computerized server and sent to the wearable device via blue-tooth or cable.

Step 710 discloses the wearable device receiving information concerning a real world location modeled into a virtual location in a computerized server. The real world location may be a house, a city, desert, beach, nature, human creation and a combination thereof. The model may be an image, a three dimensional model, a video file or any other graphic representation desired by a person skilled in the art. The model may be received from the computerized server communicating with the wearable device or from another entity, for example an on-site device comprising a transmitter configured to transmit the data to the wearable device. In some cases, such on-site device may be located near the real world location.

Step 720 discloses identifying the real world location using an augmented reality device. Identifying the real world location may be performed according to a location of the augmented reality device, for example according to a GPS receiver installed in the wearable device or in a mobile computerized device communicating with the wearable device. Identifying the real world location may be performed according to an image captured by the augmented reality device. The captured image may be matched to an image stored in the wearable device or sent to a server for determining the real location captured by the camera. Identifying the real world location may comprise a user of the augmented reality device selecting the real world location from a plurality of optional locations.

Step 730 discloses displaying the virtual location on a wearable device. Step 740 discloses receiving a request from a user of the wearable device for additional content used to modify the virtual location. Such additional content may be graphics or elements not stored in or accessible to the wearable device and desired by the user. Thus, the user's request is received at the wearable device, for example via a user interface installed in the wearable device, for example a virtual keyboard or another input unit communicating with or embedded in the wearable device. The request for additional content is then sent to the computerized server that manages the process of modifying the virtual location. The server determines whether or not to provide additional content, and whether or not the user is entitled to such content. For example, the content may be supplied upon receipt of payment from the user's wearable device payment account. Step 750 discloses downloading content items to the wearable device, said content items are used by a user of the wearable device to modify the virtual location.

Step 760 discloses receiving commands from a user of the wearable device to modify the virtual location. The commands to modify the virtual location may be defined according to constrains and rules of the real world. The commands may include adding, removing or changing elements in the virtual location. The element in the model may change its location, posture, color, texture and the like. The commands may be part of a multi-player game, in which multiple players try to modify a real location by sending their votes as commands to modify the real location as modeled in the wearable device. The server thus receives the votes and determines which option is the selected option to modify the real location.

Step 770 discloses transmitting the commands concerning modification of the virtual location from the augmented reality device to the computerized server. In some cases, many users communicate with the server and send the commands as votes to decide how the real world will be modified. At least some of the votes are sent to the server from wearable devices as disclosed herein.

Figure 8:
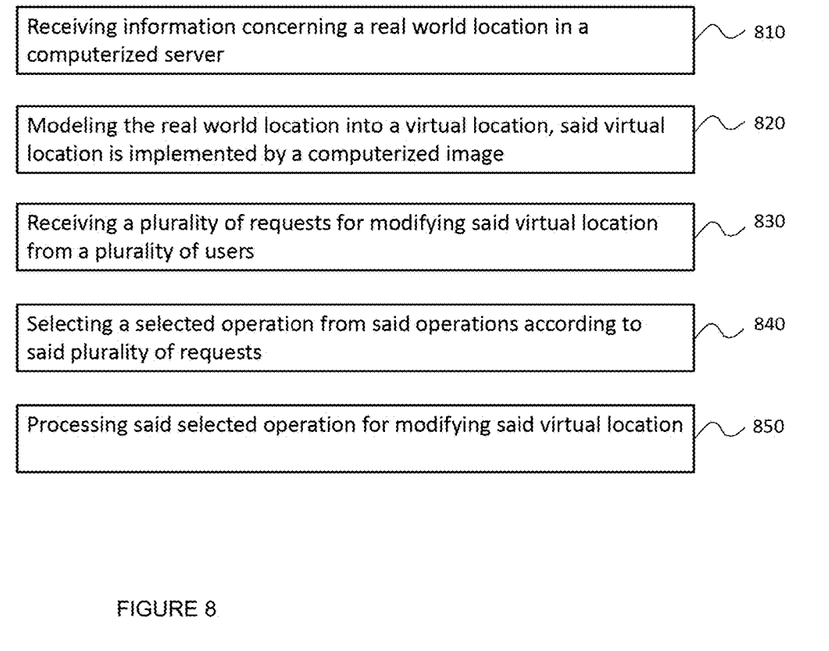
FIG. 8 shows a method of modeling a real location by a server communicating with multiple wearable devices, in accordance with some exemplary embodiments of the disclosed subject matter.

Step 780 discloses receiving a modified virtual location from the computerized server according to commands received at the computerized server from multiple users. The computerized server may determine that the modification received from most users is the selected modification. In some cases, the modification is selected according to a complexity level of the modification. For example, removing a tree is easier than moving a building from one place to another. The complexity level may be considered by the computerized server when determining the selected modification. In some other cases, a budget is assigned to each modification selected by the plurality of users communicating with the computerized server. The budget may be considered when determining the modification. For example, the second most popular modification may be selected in case its budget is half or less of the budget of the most popular modification. In case the wearable device is an augmented reality device, the method also comprises embedding the modified virtual location received from the server into the real world captured by the augmented reality device. This can be performed by adding a layer of location modification on top of the image captured by the augmented reality device, of the real world location. In some cases, a person in charge of modifying the real world location receives the modified virtual location from the server. The modified virtual location FIG. 8 shows a method of modeling a real location by a server communicating with multiple wearable devices, in accordance with some exemplary embodiments of the disclosed subject matter. Step 810 discloses receiving information concerning a real world location in a computerized server. Step 820 discloses modeling the real world location into a virtual location, said virtual location is implemented by a computerized image. Step 830 discloses receiving a plurality of requests for modifying said virtual location from a plurality of users, wherein said requests comprising operations. The operations may be selected from a list provided by said server. Step 840 discloses selecting a selected operation from said operations according to said plurality of requests;

wherein selecting the selected operation is performed according to a rule; wherein said rule is stored in a memory of said server. Step 850 discloses processing said selected operation for modifying said virtual location. The virtual location comprises an at least one virtual element and wherein said selected operation comprises one member of a group consisting of: adding said virtual element, removing said virtual element and modifying characteristic of said virtual element.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method performed by a computerized server communicating with multiple computerized devices associated with users, for planning a virtual model based on a real world location, the method comprises:
    receiving information concerning a real world location in a computerized server;
    modeling the real world location into a virtual location, said virtual location is implemented by a computerized image;
    transmitting the modeled real world location to wearable devices of a plurality of users;
    receiving a plurality of requests for modifying said virtual location from the plurality of users via wearable devices of the plurality of users; wherein said requests comprising operations; wherein said operations being selected from a list provided by said computerized server;

selecting a selected operation from said operations according to said plurality of requests;

wherein selecting the selected operation is performed according to a rule; wherein said rule is stored in a memory of said computerized server;

processing said selected operation for modifying said virtual location; wherein said virtual location comprises an at least one virtual element and wherein said selected operation comprises one member of a group consisting of: adding said virtual element, removing said virtual element and modifying a characteristic of said virtual element.

2. The method of claim 1, wherein the wearable devices comprise augmented reality devices.

3. The method of claim 1, wherein the wearable devices comprise virtual reality devices.

4. The method of claim 1, wherein said rule comprises one member of a group consisting of: selecting from a majority of requests comprising the same operation, selecting a result of an interpolation on the requests, and selecting a selecting operation being compatible with previous selected operations.

5. The method of claim 1, wherein said characteristic of said virtual element being one member of a group consisting of size, name, design characteristic, designation of the element, utilization of the element, location and color.

6. The method of claim 1, further comprises receiving characteristics of the real world location and wherein said rule comprises characteristics of the real world location.

7. The method of claim 6, wherein said characteristics are at least one member of a group consisting of gravity, topography, locomotion, real-time operations, and communication.

8. The method of claim 1, further comprises embedding the virtual object in the virtual location according to constrains and rules of the real world.

9. The method of claim 8, further comprises sending the modified virtual location to the multiple computerized devices associated with the users.

10. A computer program product for managing an interactive game, the computer program product comprising a computer readable storage medium having program code embodied therewith, the program code executable by a computer to perform a method performed by a computerized server communicating with multiple computerized devices associated with users, for planning a virtual location, the method comprising:

receiving information concerning a real world location in a computerized server;

modeling the real world location into the virtual location, said virtual location is implemented by a computerized image displayed on a wearable device;

transmitting the modeled real world location to wearable devices of a plurality of users, each of the wearable devices comprises a display unit enabling a user of the wearable device to view the model of the real world location;

receiving a plurality of requests for modifying said virtual location from the plurality of users of the wearable device; wherein said requests comprising operations; wherein said operations being selected from a list provided by said server;

selecting a selected operation from said plurality of operations according to said plurality of requests; where selecting the selected operation is performed according to a rule;

wherein said rule is stored in a memory of said server;

processing said selected operation for modifying said virtual location;

wherein said virtual location comprises an at least one virtual element and said modifying said virtual location comprises one member of a group consisting of adding said virtual element, removing said virtual element and modifying characteristic of said virtual element.

11. A method of modifying a virtual model of a real world location, comprising:

receiving information concerning a real world location modeled into a virtual location in a computerized server;

transmitting the modeled real world location to wearable devices of a plurality of users;

displaying the virtual location on a wearable device of the wearable devices;

receiving commands from a user of the wearable device to modify the virtual location;

transmitting the commands concerning modification of the virtual location from the wearable device to the computerized server;

receiving a modified virtual location from the computerized server according to commands received at the computerized server from multiple users.

12. The method of claim 11, further comprises determining an azimuth of the wearable device.

13. The method of claim 11, wherein the wearable device is an augmented reality device, and further comprises identifying the real world location using an augmented reality device, wherein performing the method when the augmented reality device is located at the real world location.

14. The method of claim 13, wherein identifying the real world location according to a location of the augmented reality device.

15. The method of claim 13, wherein identifying the real world location according to an image captured by the augmented reality device.

16. The method of claim 13, wherein identifying the real world location comprises a user of the augmented reality device selecting the real world location from a plurality of optional locations.

17. The method of claim 11, further comprises displaying a predefined menu used by a user of the wearable device to modify the virtual location.

18. The method of claim 11, further comprises downloading content items to the wearable device, said content items are used by a user of the wearable device to modify the virtual location.

19. The method of claim 11, wherein modifying the virtual location according to constrains and rules of the real world.

20. The method of claim 11, wherein the wearable device is a virtual reality device.

* * * * *